(12) United States Patent  
Flockhart et al.

(10) Patent No.: US 8,577,015 B2
(45) Date of Patent: Nov. 5, 2013

(54) METHOD AND APPARATUS FOR THE AUTOMATED DELIVERY OF NOTIFICATIONS TO CONTACTS BASED ON PREDICTED WORK PRIORITIZATION

(75) Inventors: Andrew Flockhart, Thornton, CO (US); John Z. Taylor, Bedminster, NJ (US); Eugene P. Mathews, Marco Island, FL (US)

(73) Assignee: Avaya Inc., Basking Ridge, NJ (US)

( * ) Notice: Subject to any disclaimer, the term of this patent is extended or adjusted under 35 U.S.C. 154(b) by 1939 days.

(21) Appl. No.: 11/229,265

(22) Filed: Sep. 16, 2005

(65) Prior Publication Data

US 2007/0071222 A1    Mar. 29, 2007

(51) Int. Cl.
*H04M 3/00*    (2006.01)

(52) U.S. Cl.
USPC ................................ 379/265.06; 379/265.02

(58) Field of Classification Search
USPC .............. 379/265.02, 265.06, 265.12, 266.07
See application file for complete search history.

(56) References Cited

U.S. PATENT DOCUMENTS

| | | | |
|---|---|---|---|
| 4,163,124 | A | 7/1979 | Jolissaint |
| 4,567,323 | A | 1/1986 | Lottes et al. |
| 4,737,983 | A | 4/1988 | Frauenthal et al. |
| 4,797,911 | A | 1/1989 | Szlam et al. |
| 4,894,857 | A | 1/1990 | Szlam et al. |
| 5,001,710 | A | 3/1991 | Gawrys et al. |
| 5,097,528 | A | 3/1992 | Gursahaney et al. |
| 5,101,425 | A | 3/1992 | Darland |
| 5,155,761 | A | 10/1992 | Hammond |
| 5,164,983 | A | 11/1992 | Brown et al. |
| 5,206,903 | A | 4/1993 | Kohler et al. |
| 5,210,789 | A | 5/1993 | Jeffus et al. |
| 5,274,700 | A | 12/1993 | Gechter et al. |
| 5,278,898 | A | 1/1994 | Cambray et al. |
| 5,291,550 | A | 3/1994 | Levy et al. |
| 5,299,260 | A | 3/1994 | Shaio |
| 5,309,513 | A | 5/1994 | Rose |
| 5,335,268 | A | 8/1994 | Kelly, Jr. et al. |
| 5,335,269 | A | 8/1994 | Steinlicht |
| 5,390,243 | A | 2/1995 | Casselman et al. |
| 5,436,965 | A | 7/1995 | Grossman et al. |
| 5,444,774 | A | 8/1995 | Friedes |

(Continued)

FOREIGN PATENT DOCUMENTS

| | | |
|---|---|---|
| CA | 2143198 | 1/1995 |
| CA | 2174762 | 6/1995 |

(Continued)

OTHER PUBLICATIONS

Search Report for UK Patent Application No. GB0617494.0, mailed Nov. 28, 2006.

(Continued)

*Primary Examiner* — Rasha Al Aubaidi
(74) *Attorney, Agent, or Firm* — Sheridan Ross P.C.

(57) ABSTRACT

In one embodiment, a contact center is provided that includes: (a) a work item queue 208, 250 comprising an intra-enterprise contact associated with at least first and second internal endpoints of an enterprise; and (b) a selector operable to select and assign a work item to an agent. In selecting the work item, the selector considers both a customer contact and the intra-enterprise contact. The intra-enterprise contact, for example, can be a training notification.

24 Claims, 4 Drawing Sheets

(56) References Cited

U.S. PATENT DOCUMENTS

| | | | |
|---|---|---|---|
| 5,469,503 A | 11/1995 | Butensky et al. |
| 5,469,504 A | 11/1995 | Blaha |
| 5,473,773 A | 12/1995 | Aman et al. |
| 5,479,497 A | 12/1995 | Kovarik |
| 5,500,795 A | 3/1996 | Powers et al. |
| 5,504,894 A | 4/1996 | Ferguson et al. |
| 5,506,898 A | 4/1996 | Costantini et al. |
| 5,530,744 A | 6/1996 | Charalambous et al. |
| 5,537,470 A | 7/1996 | Lee |
| 5,537,542 A | 7/1996 | Eilert et al. |
| 5,544,232 A | 8/1996 | Baker et al. |
| 5,546,452 A | 8/1996 | Andrews et al. |
| 5,592,378 A | 1/1997 | Cameron et al. |
| 5,592,542 A | 1/1997 | Honda et al. |
| 5,594,726 A | 1/1997 | Thompson et al. |
| 5,606,361 A | 2/1997 | Davidsohn et al. |
| 5,611,076 A | 3/1997 | Durflinger et al. |
| 5,627,884 A | 5/1997 | Williams et al. |
| 5,642,515 A | 6/1997 | Jones et al. |
| 5,684,872 A | 11/1997 | Flockhart et al. |
| 5,684,964 A | 11/1997 | Powers et al. |
| 5,689,698 A | 11/1997 | Jones et al. |
| 5,703,943 A | 12/1997 | Otto |
| 5,713,014 A | 1/1998 | Durflinger et al. |
| 5,721,770 A | 2/1998 | Kohler |
| 5,724,092 A | 3/1998 | Davidsohn et al. |
| 5,740,238 A | 4/1998 | Flockhart et al. |
| 5,742,675 A | 4/1998 | Kilander et al. |
| 5,748,468 A | 5/1998 | Notenboom et al. |
| 5,749,079 A | 5/1998 | Yong et al. |
| 5,751,707 A | 5/1998 | Voit et al. |
| 5,752,027 A | 5/1998 | Familiar |
| 5,754,639 A | 5/1998 | Flockhart et al. |
| 5,754,776 A | 5/1998 | Hales et al. |
| 5,754,841 A | 5/1998 | Carino, Jr. |
| 5,757,904 A | 5/1998 | Anderson |
| 5,790,677 A | 8/1998 | Fox et al. |
| 5,790,798 A * | 8/1998 | Beckett et al. ................ 709/224 |
| 5,794,250 A | 8/1998 | Carino, Jr. et al. |
| 5,796,393 A | 8/1998 | MacNaughton et al. |
| 5,802,282 A | 9/1998 | Hales et al. |
| 5,818,907 A | 10/1998 | Maloney et al. |
| 5,825,869 A | 10/1998 | Brooks et al. |
| 5,828,747 A | 10/1998 | Fisher et al. |
| 5,838,968 A | 11/1998 | Culbert |
| 5,839,117 A | 11/1998 | Cameron et al. |
| 5,875,437 A | 2/1999 | Atkins |
| 5,880,720 A | 3/1999 | Iwafune et al. |
| 5,881,238 A | 3/1999 | Aman et al. |
| 5,884,032 A | 3/1999 | Bateman et al. |
| 5,889,956 A | 3/1999 | Hauser et al. |
| 5,897,622 A | 4/1999 | Blinn et al. |
| 5,903,641 A | 5/1999 | Tonisson |
| 5,903,877 A | 5/1999 | Berkowitz et al. |
| 5,905,793 A | 5/1999 | Flockhart et al. |
| 5,915,012 A | 6/1999 | Miloslavsky |
| 5,926,538 A | 7/1999 | Deryugin et al. |
| 5,930,786 A | 7/1999 | Carino, Jr. et al. |
| 5,937,051 A | 8/1999 | Hurd et al. |
| 5,937,402 A | 8/1999 | Pandit |
| 5,940,496 A | 8/1999 | Gisby et al. |
| 5,943,416 A | 8/1999 | Gisby |
| 5,948,065 A | 9/1999 | Eilert et al. |
| 5,960,073 A | 9/1999 | Kikinis et al. |
| 5,963,635 A | 10/1999 | Szlam et al. |
| 5,963,911 A | 10/1999 | Walker et al. |
| 5,970,132 A | 10/1999 | Brady |
| 5,974,135 A | 10/1999 | Breneman et al. |
| 5,974,462 A | 10/1999 | Aman et al. |
| 5,982,873 A | 11/1999 | Flockhart et al. |
| 5,987,117 A | 11/1999 | McNeil et al. |
| 5,991,392 A | 11/1999 | Miloslavsky |
| 5,996,013 A | 11/1999 | Delp et al. |
| 5,999,963 A | 12/1999 | Bruno et al. |
| 6,000,832 A | 12/1999 | Franklin et al. |
| 6,011,844 A | 1/2000 | Uppaluru et al. |
| 6,038,293 A | 3/2000 | Mcnerney et al. |
| 6,044,144 A | 3/2000 | Becker et al. |
| 6,044,205 A | 3/2000 | Reed et al. |
| 6,044,355 A | 3/2000 | Crockett et al. |
| 6,049,547 A | 4/2000 | Fisher et al. |
| 6,052,723 A | 4/2000 | Ginn |
| 6,055,308 A | 4/2000 | Miloslavsky et al. |
| 6,064,730 A | 5/2000 | Ginsberg |
| 6,064,731 A | 5/2000 | Flockhart et al. |
| 6,084,954 A | 7/2000 | Harless |
| 6,088,441 A | 7/2000 | Flockhart et al. |
| 6,115,462 A | 9/2000 | Servi et al. |
| 6,128,380 A * | 10/2000 | Shaffer et al. ............ 379/265.01 |
| 6,151,571 A | 11/2000 | Pertrushin |
| 6,154,769 A | 11/2000 | Cherkasova et al. |
| 6,163,607 A | 12/2000 | Bogart et al. |
| 6,173,053 B1 | 1/2001 | Bogart et al. |
| 6,175,564 B1 | 1/2001 | Miloslavsky et al. |
| 6,178,441 B1 | 1/2001 | Elnozahy |
| 6,185,292 B1 | 2/2001 | Miloslavsky |
| 6,192,122 B1 | 2/2001 | Flockhart et al. |
| 6,215,865 B1 | 4/2001 | McCalmont |
| 6,226,377 B1 | 5/2001 | Donaghue, Jr. |
| 6,229,819 B1 | 5/2001 | Darland et al. |
| 6,230,183 B1 | 5/2001 | Yocom et al. |
| 6,233,333 B1 | 5/2001 | Dezonmo |
| 6,240,417 B1 | 5/2001 | Eastwick et al. |
| 6,259,969 B1 | 7/2001 | Tackett et al. |
| 6,263,359 B1 | 7/2001 | Fong et al. |
| 6,272,544 B1 | 8/2001 | Mullen |
| 6,275,806 B1 | 8/2001 | Pertrushin |
| 6,275,812 B1 | 8/2001 | Haq et al. |
| 6,275,991 B1 | 8/2001 | Erlin |
| 6,278,777 B1 | 8/2001 | Morley |
| 6,292,550 B1 | 9/2001 | Burritt |
| 6,295,353 B1 | 9/2001 | Flockhart et al. |
| 6,301,573 B1 | 10/2001 | McIlwaine et al. |
| 6,324,282 B1 | 11/2001 | McIllwaine et al. |
| 6,353,810 B1 | 3/2002 | Petrushin |
| 6,356,632 B1 | 3/2002 | Foster et al. |
| 6,366,668 B1 | 4/2002 | Borst et al. |
| 6,389,028 B1 | 5/2002 | Bondarenko et al. |
| 6,389,132 B1 | 5/2002 | Price |
| 6,389,400 B1 | 5/2002 | Bushey et al. |
| 6,424,709 B1 | 7/2002 | Doyle et al. |
| 6,426,950 B1 | 7/2002 | Mistry |
| 6,427,137 B2 | 7/2002 | Petrushin |
| 6,430,282 B1 | 8/2002 | Bannister et al. |
| 6,434,230 B1 | 8/2002 | Gabriel |
| 6,449,356 B1 | 9/2002 | Dezonno |
| 6,449,358 B1 | 9/2002 | Anisimov et al. |
| 6,449,646 B1 | 9/2002 | Sikora et al. |
| 6,453,038 B1 | 9/2002 | McFarlane et al. |
| 6,459,787 B2 | 10/2002 | McIllwaine et al. |
| 6,463,148 B1 | 10/2002 | Brady |
| 6,463,346 B1 | 10/2002 | Flockhart et al. |
| 6,463,415 B2 | 10/2002 | St. John |
| 6,480,826 B2 | 11/2002 | Pertrushin |
| 6,490,350 B2 | 12/2002 | McDuff et al. |
| 6,535,600 B1 | 3/2003 | Fisher et al. |
| 6,535,601 B1 | 3/2003 | Flockhart et al. |
| 6,560,330 B2 | 5/2003 | Gabriel |
| 6,560,649 B1 | 5/2003 | Mullen et al. |
| 6,560,707 B2 | 5/2003 | Curtis et al. |
| 6,563,920 B1 | 5/2003 | Flockhart et al. |
| 6,597,685 B2 | 7/2003 | Miloslavsky et al. |
| 6,614,903 B1 | 9/2003 | Flockhart et al. |
| 6,628,777 B1 | 9/2003 | McIllwaine et al. |
| 6,650,748 B1 | 11/2003 | Edwards et al. |
| 6,697,457 B2 | 2/2004 | Petrushin |
| 6,704,409 B1 | 3/2004 | Dilip et al. |
| 6,707,903 B2 | 3/2004 | Burok et al. |
| 6,754,333 B1 | 6/2004 | Flockhart et al. |
| 6,766,013 B2 | 7/2004 | Flockhart et al. |
| 6,766,014 B2 | 7/2004 | Flockhart et al. |
| 6,775,377 B2 | 8/2004 | McIllwaine et al. |
| 6,947,543 B2 | 9/2005 | Alvarado et al. |
| 7,035,927 B2 | 4/2006 | Flockhart et al. |

(56) References Cited

U.S. PATENT DOCUMENTS

| | | | |
|---|---|---|---|
| 2001/0056349 | A1 | 12/2001 | St. John |
| 2002/0002460 | A1 | 1/2002 | Pertrushin |
| 2002/0002464 | A1 | 1/2002 | Petrushin |
| 2002/0009190 | A1 | 1/2002 | McIllwaine et al. |
| 2002/0010587 | A1 | 1/2002 | Pertrushin |
| 2002/0118816 | A1 | 8/2002 | Flockhart et al. |
| 2002/0181692 | A1 | 12/2002 | Flockhart et al. |
| 2002/0194002 | A1 | 12/2002 | Petrushin |
| 2003/0048893 | A1 | 3/2003 | McIllwaine et al. |
| 2003/0086555 | A1 | 5/2003 | McIllwaine et al. |
| 2003/0123642 | A1 | 7/2003 | Alvarado et al. |
| 2003/0152212 | A1 | 8/2003 | Burok et al. |
| 2003/0174830 | A1 | 9/2003 | Boyer et al. |
| 2003/0177017 | A1 | 9/2003 | Boyer et al. |
| 2003/0177231 | A1 | 9/2003 | Flockhart et al. |
| 2004/0083195 | A1* | 4/2004 | McCord et al. .............. 706/47 |
| 2004/0165717 | A1 | 8/2004 | McIlwaine et al. |
| 2004/0202308 | A1 | 10/2004 | Baggenstoss et al. |
| 2004/0202309 | A1 | 10/2004 | Baggebstoss et al. |
| 2004/0203878 | A1 | 10/2004 | Thomson |
| 2005/0175971 | A1 | 8/2005 | McIlwaine et al. |
| 2006/0182259 | A1* | 8/2006 | Shaffer et al. ............ 379/265.02 |
| 2006/0233346 | A1* | 10/2006 | McIlwaine et al. ...... 379/265.02 |
| 2006/0256953 | A1* | 11/2006 | Pulaski et al. ........... 379/265.06 |

FOREIGN PATENT DOCUMENTS

| | | |
|---|---|---|
| EP | 0 501 189 A2 | 9/1992 |
| EP | 0 740 450 A2 | 10/1996 |
| EP | 0 772 335 A2 | 5/1997 |
| EP | 0 855 826 A2 | 7/1998 |
| EP | 0 863 651 A2 | 9/1998 |
| EP | 0829996 A2 | 9/1998 |
| EP | 0866407 A1 | 9/1998 |
| EP | 899673 A2 | 3/1999 |
| EP | 0982915 | 3/2000 |
| EP | 998108 A1 | 5/2000 |
| EP | 1091307 A2 | 4/2001 |
| EP | 1150236 | 10/2001 |
| GB | 2 273 418 | 6/1994 |
| GB | 2 290 192 A | 12/1995 |
| WO | WO 96/07141 | 3/1996 |
| WO | WO 97/28635 | 8/1997 |
| WO | PCT/SE98/01074 | 12/1998 |
| WO | WO 98/56207 | 12/1998 |
| WO | 2005/011240 | 2/2005 |

OTHER PUBLICATIONS

First Examination Report for Indian Patent Application No. 1698/CHE/2006, mailed May 30, 2008.
Official Action (including translation) for German Patent Application No. 10 2006 042 527.8-53, dated Mar. 19, 2009.
U.S. Appl. No. 09/235,065, Denton et al.
U.S. Appl. No. 09/247,893, Edwards et al.
U.S. Appl. No. 09/264,497, Edwards.
U.S. Appl. No. 09/756,955, Flockhart et al.
U.S. Appl. No. 09/420,912, Ford.
U.S. Appl. No. 09/416,737, Flockhart et al.
U.S. Appl. No. 10/098,824, Flockhart et al.
U.S. Appl. No. 10/673,118, Flockhart et al.
U.S. Appl. No. 10/673,115, Flockhart et al.
U.S. Appl. No. 10/673,103, Flockhart et al.
U.S. Appl. No. 10/673,105, Flockhart et al.
U.S. Appl. No. 10/683,039, Flockhart et al.
U.S. Appl. No. 10/099,144, Boyer et al.
U.S. Appl. No. 10/815,534, Flockhart et al.
U.S. Appl. No. 10/815,566, Kiefhaber et al.
U.S. Appl. No. 10/815,584, Kiefhaber et al.
U.S. Appl. No. 10/861,193, Flockhart et al.
U.S. Appl. No. 10/891,346, Flockhart et al.
U.S. Appl. No. 10/946,638, Flockhart et al.
U.S. Appl. No. 10/000,686, Flockhart et al.
"Product Features," *Guide to Call Center Automation*, Brock Control Systems, Inc., Activity Managers Series™, Section 5—Company B120, p. 59, 1992.
"Product Features," *Guide to Call Center Automation*, CRC Information Systems, Inc., Tel-ATHENA, Section 5—Company C520, p. 95, 1992.
Dawson, "NPRI's Powerguide, Software Overview" *Call Center Magazine* (Jun. 1993), p. 85.
"Applications, NPRI's Predictive Dialing Package," *Computer Technology* (Fall 1993), p. 86.
"Call Center Software You Can't Outgrow," *Telemarketing@* (Jul. 1993), p. 105.
"VAST™, Voicelink Application Software for Teleservicing®" *System Manager User's Guide*, Digital Systems (1994), pp. ii, vii-ix, 1-2, 2-41 through 2-77.
GEOTEL Communications Corporation Web site printout entitled "Intelligent CallRouter™, Optimizing the Interaction Between Customers and Answering Resources," 6 pages.
Avaya, Inc. Business Advocate Product Summary, at http://www.avaya.com, downloaded on Feb. 15, 2003, Avaya, Inc. 2003, 3 pages.
Avaya, Inc. Business Advocate Options, at http://www.avaya.com, downloaded on Feb. 15, 2003, Avaya, Inc. 2003.
"Internet Protocol Addressing," available at http://samspade.org/d/ipdns.html, downloaded Mar. 31, 2003, 4 pages.
"Domain Name Services," available at http://www.pism.com/chapt09/chapt09.html, downloaded Mar. 31, 2003, 21 pages.
Bellsouth Corp., "Frequently Asked Questions—What is a registrar?," available at https://registration.bellsouth.net/NASApp/DNSWebUI/FAQ.jsp, downloaded Mar. 31, 2003, 4 pages.
Foster, Robin, et al., "Avaya Business Advocate and its Relationship to Multi-Site Load Balancing Applications," Avaya, Inc., Mar. 2002, 14 pages.
Chavez, David, et al., "Avaya MultiVantage Software: Adapting Proven Call Processing for the Transition to Converged IP Networks," Avaya, Inc., Aug. 2002.
*CentreVu Advocate Release 9 User Guide*, Avaya Inc., 585-215-953, Issue 1 (Dec. 2000), pp. 1-210.
"The Advantages of Load Balancing in the Multi-Call Center Enterprise," Avaya Inc. White Paper (Feb. 2002), pp. 1-13.
Doo-Hyun Kim et al. "Collaborative Multimedia Middleware Architecture and Advanced Internet Call Center," Proceedings at the International Conference on Information Networking (Jan. 31, 2001), pp. 246-250.
"When Talk Isn't Cheap," *Sm@rt Reseller*, v. 3, n. 13 (Apr. 3, 2000), p. 50.
"eGain's Commerce 2000 Platform Sets New Standard for eCommerce Customer Communications," *Business Wire* (Nov. 15, 1999)., 3 pages.
Knowlagent r7—Enable and Certify the Adoption of Change to Deliver Predictable Call Outcomes, at http://216.86.37/solution_r7.asp, 1 page.
Ahmed, Sarah, "A Scalable Byzantine Fault Tolerant Secure Domain Name System," thesis submitted to Massachusetts Institute of Technology, Department of Electrical Engineering and Computer Science, Jan. 22, 2001, 101 pages.
Avaya, Inc., "Better Implementation of IP in Large Networks," Avaya, Inc. 2002, 14 pages.
Avaya, Inc., "Voice Over IP Via Virtual Private Networks: An Overview," Avaya, Inc., Feb. 2001, 9 pages.
Coles, Scott, "A Guide for Ensuring Service Quality in IP Voice Networks," Avaya, Inc., 2002, pp. 1-17.
E. Noth et al., "Research Issues for the Next Generation Spoken": University of Erlangen-Nuremberg, Bavarian R.
John H.L. Hansen and Levent M. Arsian, Foreign Accent Classification Using Source Generator Based Prosodic Features, IEEE Proc. ICASSP, vol. 1, pp. 836-839, Detroit USA (May 1995).
L.F. Lamel and J.L. Gauvain, Language Identification Using Phone-Based Acoustic Likelihood, ICASSP-94, date unknown; 4 pages.
Levent M. Arsian and John H.L. Hansen, Language Accent Classification in American English, Robust Speech Processing Laboratory, Duke University Department of Electrical Engineering, Durham, NC, Technical Report RSPL-96-7, revised Jan. 29, 1996. pp. 1-16.

(56) References Cited

OTHER PUBLICATIONS

Levent M. Arsian, Foreign Accent Classification in American English, Department of Electrical Computer Engineering, Duke University, Thesis, pp. 1-200 (1996).

MIT Project Oxygen, Pervasive, Human-Centered Computing (MIT Laboratory for Computer Science) (Jun. 2000) pp. 1-15.

Presentation by Victor Zue, The MIT Oxygen Project, MIT Laboratory for Computer Science (Apr. 25-26, 2000) 9 pages.

Stevenson et al.; "Name Resolution in Network and Systems Management Environments"; http://netman.cit.buffalo.edu/Doc/DStevenson/NR-NMSE.html; printed Mar. 31, 2003; 16 pages.

Official Action (including translation) for German Patent Application No. 10 2006 042 527.8-53, dated Jul. 31, 2007.

Official Action (including translation) for German Patent Application No. 10 2006 042527.5-53, dated Aug. 11, 2010.

Examination Report under Section 18(3) for UK Patent Application No. GB0617494.0, dated Oct. 9, 2009.

Abbreviated Examination Report under Section 18(3) for UK Patent Application No. GB0617494.0, dated Jul. 1, 2009.

\* cited by examiner

METHOD AND APPARATUS FOR THE AUTOMATED DELIVERY OF NOTIFICATIONS TO CONTACTS BASED ON PREDICTED WORK PRIORITIZATION

FIELD OF THE INVENTION

The invention relates generally to contact centers and particularly to intra-contact center contact processing.

BACKGROUND OF THE INVENTION

Contact centers, such as Automatic Call Distribution or ACD systems, are employed by many enterprises to service customer contacts. A typical contact center includes a switch and/or server to receive and route incoming packet-switched and/or circuit-switched interactions and one or more resources, such as human agents and automated resources (e.g., Interactive Voice Response (IVR) units), to service the incoming customer contacts.

The ACD workflow routing engine in the contact center directs contacts to various agents based on sophisticated algorithms and a number of predetermined criteria. Typically the criteria for servicing the contact, from the moment the contact center becomes aware of the contact until the contact is connected to an agent, are customer-specifiable (i.e., programmable by the operator or manager of the contact center), via a capability called vectoring for calls, or through complex programmable workflows that determine the right or "optimal" agent based on various predetermined criteria. Normally, predetermined criteria include agent skills, interaction requirements, media type and availability of an agent, expected contact wait time, customer identity, customer class membership, relatedness to other customer communications (e.g., threads), previous interaction history, etc. ACDs commonly use skills-based routing in which the ACD identifies all predefined customer interaction-handling skills of the agent and delivers to the agent the contact that matches the agent's highest-priority skill. If the contact is document-based (e.g., email, fax, Short Message Service or SMS message, instant message, etc.), the matching can also be done based on analyzing the contact's content via natural language processing of the content to determine the topic and then routing the contact to an agent deemed the Subject Matter Expert or SME for that topic. Commonly, the only conditions that result in a customer contact not being delivered are that there are no available agents (in which case the contact is queued to be routed to the next available agent) or that there are no customer contacts to be delivered.

In contact centers, there is frequently a need to provide intra-enterprise contacts, such as agent-to-agent contacts and supervisor-to-agent contacts, to agents in a manner that does not interrupt the servicing of customer contacts. The current approaches for delivering such contacts, and their drawbacks, are best illustrated by supervisor-to-agent contacts provided to agents as part of a training program to improve agent performance.

Currently, training programs involve monitoring agent interactions in the contact center, collecting and analyzing the events against a norm (or desired interaction), and delivering a visual indication of the process violation or improvement to a supervisor or agent against future state interactions which may meet similar criteria. The remedy for this situation may be an offline coaching session or a training module notification delivered during lulls in contact demand.

Current approaches do not predictively assess the impact of how to balance whether a resource should receive a customer contact or an agent training notification against the total work occurring in real time in the contact center. Current approaches depend on human resources to coach the agent on their process violations once they occur and are aggregated, perhaps taking the agent offline, or "interrupting" current call processing at the expense of real-time service goals, or waiting for scheduled or unscheduled "lulls" in customer contacts.

Current approaches do not anticipate work that is "about to occur", or "is occurring", which may be at risk for similar inefficient service or lack of relevant information. In other words, the approaches aggregate only work that has already occurred.

Current approaches do not assess the impact of imparting additional information to particular call types against total service level commitment occurring in real time in the contact center. Such information is relevant when an impending contact type, that has been previously serviced poorly, is identified in the work queue and when a contact is received that could benefit from a process improvement, such as imparting additional information or insights to the customer (such as additional offers).

Finally, current approaches do not deliver notifications independent of any impending contact.

SUMMARY OF THE INVENTION

These and other needs are addressed by the various embodiments and configurations of the present invention. The present invention is directed generally to the use of the contact center workflow routing logic to assign not only customer contacts but also intra-enterprise contacts to agents.

In one embodiment, a method for operating a contact center is provided. The method includes the steps:

(a) enqueuing, in a work item queue, an intra-enterprise contact associated with first and second internal endpoints of the enterprise network;

(b) selecting a work item for assignment to an agent, wherein, in selecting the work item, the work item selector considers both pending customer contacts and the intra-enterprise; and (c) assigning the selected work item to an agent.

In another embodiment, a method for operating a contact center includes the steps:

(a) providing an intra-enterprise contact intended for multiple agents; and (b) when each of the multiple agents is available, delivering the intra-enterprise contact the agent. The intra-enterprise contact is delivered to each of the multiple agents at a different time. The intra-enterprise contact can itself be addressed to multiple agents or be divided into multiple related contacts. Each of the multiple, related contacts is addressed to a different one of the multiple agents.

In one configuration, the above methods can provide improved customer service and contact center effectiveness by posturing training content as notifications delivered to the contact center routing engine as an item of work. The training notifications are delivered under a system that evaluates and predicts the consequences of delivering the notification rather than a customer contact against the overall contact center service objectives. The notifications are useful as an automated or semi-automated mentoring system for trainees to warn them about process violations, mistakes, successes, or general "need-to-know" information. Such a mechanism can provide substantially real-time feedback to agents for recent mistakes before the mistakes are repeated during servicing of other customer contacts. The notifications can be from a number of sources, including audio, visual, text, etc.

In one configuration, the routing engine assesses the inventory of work items in the contact center queue and uses a contact distribution predictor to establish whether or not to distribute an impending contact (by evaluating the impact of distributing the contact against the overall service goals) or deliver a notification to the agent instead. Both the notification or the contact is viewed by the engine as a potential work item to be evaluated for potential distribution to the agent. Additionally, if interactions could benefit from added information being made known to the contact center agents, notifications are delivered to the agent before the impending contact is assigned. An exemplary notification would be: "Sales Associates, remember our 20% quarter end discount ends tomorrow." Such notifications could be delivered to sales agents as the sales queue builds, and sales calls are distributed to agents. The invention could also deliver a brief notification to the agent as the contact arrives with specific instructions on how to effectively serve the customer and overcome prior servicing errors for contacts of the same type handled in the recent past. Such a notification can result in the contact center consistently meeting and exceeding customer service expectations for error free service, experiencing fewer errors in customer interactions by effective distribution of knowledge of recent prior servicing errors, improving the quality and consistency of information delivered by contact center resource(s) to the customer, and providing a mechanism under which knowledge is imparted to resources in real time that helps prepare the resource to deliver service that is repeatable, from both an efficiency and effectiveness standpoint, for contacts "about to occur" or that "have occurred".

The invention can be used to more flexibly improve the working environment of contact center agents. For example, when there is an agent surplus in a particular skill group, the following agent notification could be sent: "Agents in Team A, please take your 10 minute coffee break now."

The present invention can solve the problem of balancing the relative values of servicing impending customer contacts versus a notification to improve work processes of agents. The invention can assess the value of both possibilities by blending the traditional contact queue with a notification queue that views both types of contacts as possible types of work to perform. By comparing the consequence of distributing one type of work item versus another and thereby assessing the value of whether or not to service a specific call or notification, the enterprise can balance its resource training and customer service goals simultaneously. Stated another way, the invention can assess whether servicing a notification over a customer contact will place the service level goals at risk or whether servicing a customer contact over a notification might lead to a lower degree of service for a subsequent customer contact. Moreover, the normal flow of work item handling by an agent is not interrupted at inopportune times by an interruption containing training or other information.

The contact center can also prepare the contact center agent with relevant guidance and/or information about a contact as it is distributed to them via a brief notification.

These and other advantages will be apparent from the disclosure of the invention(s) contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

The invention will be illustrated below in conjunction with an exemplary communication system. Although well suited for use with, e.g., a system having an ACD or other similar contact processing switch, the invention is not limited to use with any particular type of communication system switch or configuration of system elements. Those skilled in the art will recognize that the disclosed techniques may be used in any communication application in which it is desirable to provide improved contact processing.

Figure 1:
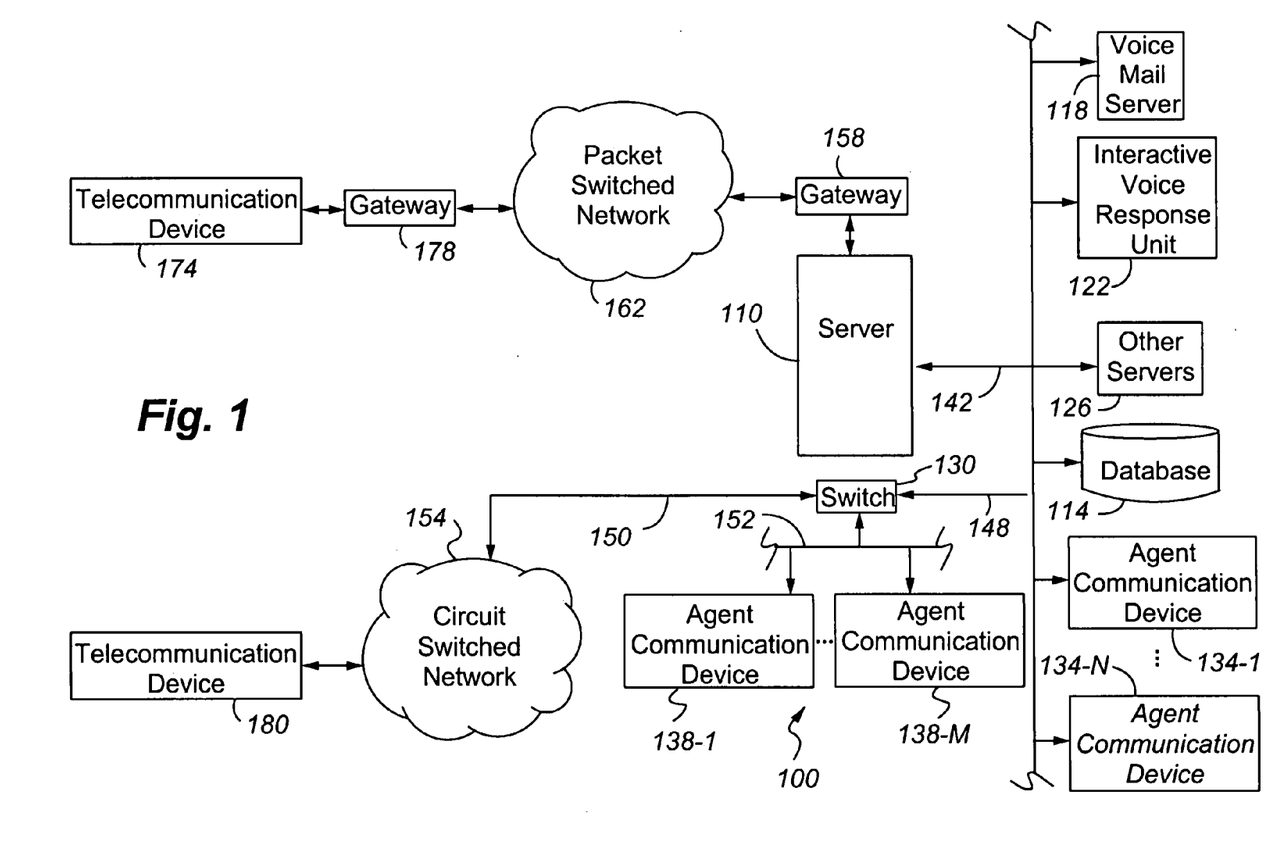
FIG. 1 is a block diagram of a contact center according to an embodiment of the present invention.

FIG. 1 shows an illustrative embodiment of the present invention. A contact center 100 (which corresponds to the enterprise network) comprises a central server 110, a set of data stores or databases 114 containing contact or customer related information and other information that can enhance the value and efficiency of the contact, and a plurality of servers, namely a voice mail server 118, an Interactive Voice Response unit or IVR 122, and other servers 126, a switch 130, a plurality of working agents (not shown) operating packet-switched (first) telecommunication devices 134-1 to N (such as computer work stations or personal computers), and/or circuit-switched (second) telecommunication devices 138-1 to M, all interconnected by a local area network LAN (or wide area network WAN) 142. The servers can be connected via optional communication lines 148 to the switch 130. As will be appreciated, the other servers 126 can also include a scanner (which is normally not connected to the switch 130 or Web server), VoIP software, video contact software, voice messaging software, an IP voice server, a fax server, a web server, and an email server) and the like. The switch 130 is connected via a plurality of trunks 150 to the Public Switch Telecommunication Network or PSTN 154 and via link(s) 152 to the second telecommunication devices 138-1 to M. A gateway 158 is positioned between the server 110 and the packet-switched network 162 to process communications passing between the server 110 and the network 162.

The term "switch" or "server" as used herein should be understood to include a PBX, an ACD, an enterprise switch, an enterprise server, or other type of telecommunications system switch or server, as well as other types of processor-based communication control devices such as media servers, computers, adjuncts, etc. The switch 130 and/or server 110 can be any architecture for directing contacts to one or more telecommunication devices. Illustratively, the switch and/or server can be a modified form of Avaya Inc.'s Definity™ Private-Branch Exchange (PBX)-based ACD system; Multi-Vantage™ PBX, CRM Central 2000 Server™, Communication Manager™, S8300™ media server, and/or Avaya Interaction Center™. Typically, the switch/server is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. The switch and/or server typically include a network interface card (not shown) to provide services to the serviced telecommunication devices. Other types of known switches and servers are well known in the art and therefore not described in detail herein.

Referring to FIG. 1, the gateway 158 can be any suitable protocol conversion device, such as Avaya Inc.'s, G700™, G600™, MCC/SCC™ media gateway and may be implemented as hardware such as via an adjunct processor (as shown) or as a chip in the server.

The first (subscriber) telecommunication devices 134-1, . . . 134-N are packet-switched and can include, for example, IP hardphones such as the Avaya Inc.'s 4600 Series IP Phones™, IP softphones such as Avaya Inc.'s IP Softphone™, Personal Digital Assistants or PDAs, Personal Computers or PCs, laptops, packet-based H.320 video phones and conferencing units, packet-based voice messaging and response units, and packet-based traditional computer telephony adjuncts.

The second (subscriber) telecommunication devices 138-1, . . . 138-M are circuit-switched. Each of the telecommunication devices 138-1, . . . 138-M corresponds to one of a set of internal extensions Ext1, . . . ExtM, respectively. These extensions are referred to herein as "internal" in that they are extensions within the premises that are directly serviced by the switch. More particularly, these extensions correspond to conventional telecommunication device endpoints serviced by the switch/server, and the switch/server can direct incoming contacts to and receive outgoing contacts from these extensions in a conventional manner. The second telecommunication devices can include, for example, wired and wireless telephones, PDAs, H.320 video phones and conferencing units, voice messaging and response units, and traditional computer telephony adjuncts.

It should be noted that the invention does not require any particular type of information transport medium between switch or server and first and second telecommunication devices, i.e., the invention may be implemented with any desired type of transport medium as well as combinations of different types of transport medium.

The packet-switched network 162 can be any data and/or distributed processing network, such as the Internet. The network 162 typically includes proxies (not shown), registrars (not shown), and routers (not shown) for managing packet flows.

The packet-switched network 162 is in communication with an external (nonsubscriber) first telecommunication device 174 via a gateway 178, and the circuit-switched network 154 with an external second telecommunication device 180. These telecommunication devices are customer devices and are referred to as "external" in that they are not directly supported as telecommunication device endpoints by the switch or server. The telecommunication devices 174 and 180 are an example of devices more generally referred to herein as "external endpoints."

In a preferred configuration, the server 110, network 162, and first telecommunication devices 134 are Session Initiation Protocol or SIP compatible and can include interfaces for various other protocols such as the Lightweight Directory Access Protocol or LDAP, H.248, H.323, Simple Mail Transfer Protocol or SMTP, IMAP4, ISDN, E1/T1, and analog line or trunk.

It should be emphasized that the configuration of the switch, server, user telecommunication devices, and other elements as shown in FIG. 1 is for purposes of illustration only and should not be construed as limiting the invention to any particular arrangement of elements.

Figure 2:
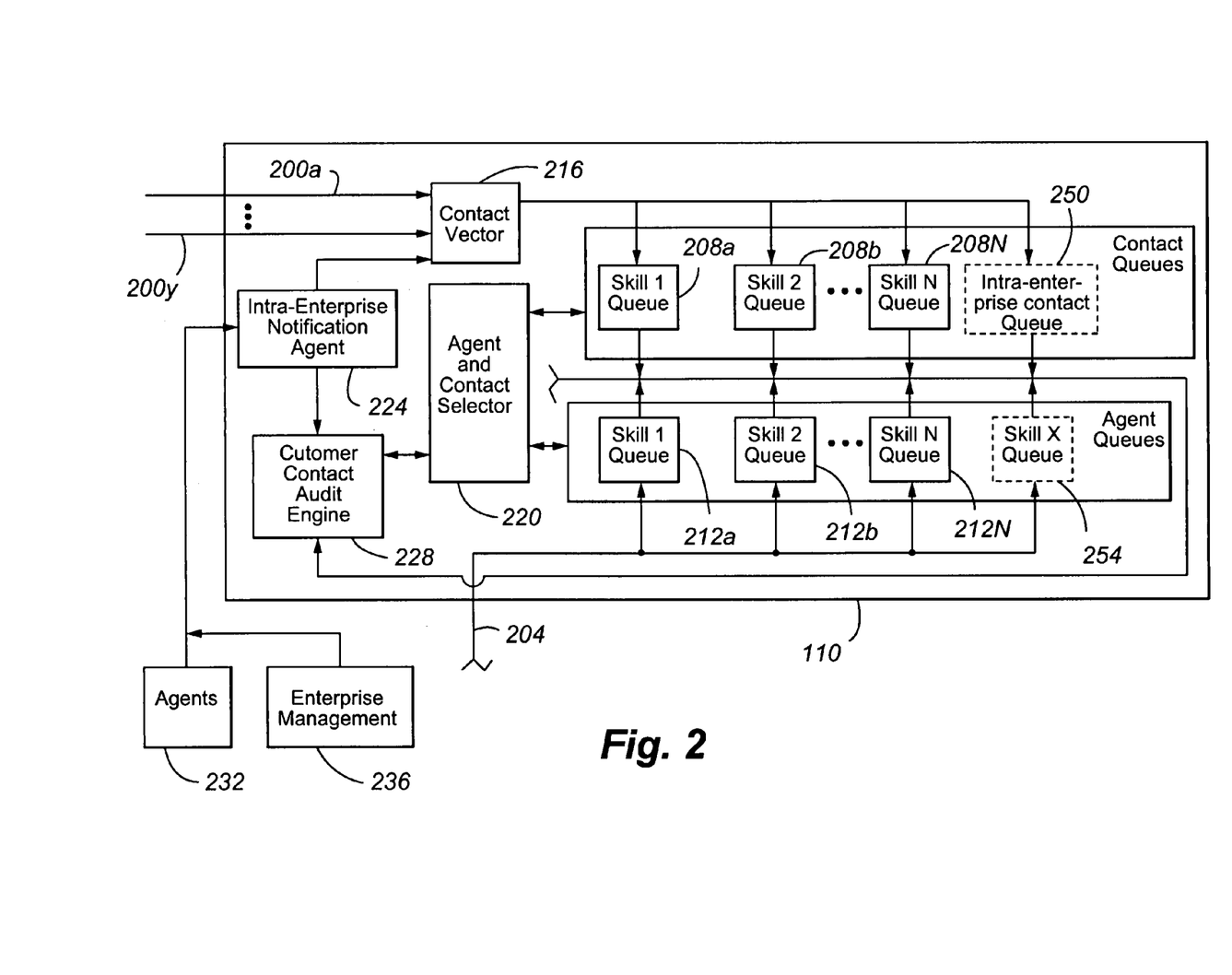
FIG. 2 is a block diagram of a server according to an embodiment of the present invention.

Referring to FIG. 2, one possible configuration of the server 110 is depicted. The server 110 is in communication with a plurality of customer communication lines 200a-y (which can be one or more trunks, phone lines, etc.) and agent communication line 204 (which can be a voice-and-data transmission line such as LAN 142 and/or a circuit switched voice line 152). The server 110 can include a number of other computational components, including an agent and contact selector 220 that determines an initial assignment of an interaction to a queue for a particular agent or queue of agents, an intra-enterprise notification agent 224 that process intra-enterprise contacts from agents 232 and/or enterprise management 236 and facilitates directing contacts to an appropriate agent or agent(s), and a Basic Call Management System™ or BCMS (not shown) and a Call Management System™ or CMS (not shown) that gathers call records and contact-center statistics for use in generating contact-center reports. An intra-enterprise contact refers to a contact from one subscriber device, such as the first and second agent communication devices, to another subscriber device and/or between internal endpoints. The BCMS or CMS includes a customer contact audit engine 228 for monitoring agent interactions in the contact center, collecting and analyzing the events against a norm (or desired interaction), and generating training notifications for delivery to agents 232 via the notification agent 224 and/or to enterprise management 236 when a process violation or improvement is identified.

Included among the data stored in the server 110 is a set of work item queues 208a-n and 250 and a separate set of agent queues 212a-n and 254. Each work item queue 208a-n and 250 corresponds to a different set of agent skills, as does each agent queue 212a-n and 254. Work items in a common queue need not be of the same media type. Conventionally, work items are prioritized and either are enqueued in individual ones of the work item queues 208a-n and/or 250 in their orders of priority or are enqueued in different ones of a plurality of work item queues that correspond to different priorities. "Work items" refer collectively to customer contacts (i.e., contacts of any media type with a customer) and intra-enterprise contacts, such as agent notifications.

Intra-enterprise-type work items can take a number of forms. They can be contacts of any media type, such as voice, video, and/or text, whether one- or two-way, and generated by a human or automated source. Typically, intra-enterprise contacts are not real time or "live"; thus, intra-enterprise contacts are typically text, video or recorded voice. They may be addressed to one or multiple agents (e.g., agent-specific or groupwide). They can be related to the business in general and/or to a particular customer. Examples of intra-enterprise work items related to the business in general include agent training or guidance notifications (e.g., "agent Y remember to obtain information X from this customer," "agent Z you are being assigned a contact from a gold customer so remember service rules 1, 2, and 3," "agent Y you made mistakes 1 and 2 when you serviced the preceding customer contact," etc,), product inventory state notifications (e.g., "product X is in stock or out-of-stock," etc.), contact center goal, objective, or policy compliance state ("goal X is in jeopardy of being missed," "agent Y you are taking too long on this customer contact," etc.), product-related notifications (e.g., "product X is being recalled," etc.), staffing level notifications (e.g., "we need two agents to work late tonight-any volunteers?," etc.), and other types of business relevant notifications. Examples of customer-specific notifications include notifications containing specific customer related information that is not currently in the database 114 and would not otherwise be provided to the customer when the customer contact is provided to the agent. Specific customer related notifications include a recent product purchase or expression of interest by the customer, recent call abandonment(s) by the customer, a recent complaint by the customer, a recent contact serviced for the customer, and the like.

Intra-enterprise contacts can be substantially real-time notifications of targeted events. For example, where an agent has made a mistake in servicing a customer the contact center can provide, in the normal work flow distribution process, a notification of the mistake so that the mistake is not repeated when the agent services the next customer contact.

Agents who are available for handling work items are assigned to agent queues 212a-n and 254 based upon the skills that they possess and/or the skill levels they possess. Agents are enqueued in individual ones of agent queues 212a-n and 254 in order of their expertise levels. Each agent's skills are commonly prioritized according to his or her level of expertise in that skill. When an agent has different levels of skill expertise (e.g., skill levels 1-N in one configuration or merely primary skills and secondary skills in another configuration), he or she may be assigned to different ones of a plurality of agent queues 212a-n and 254 that correspond to a skill and each one of which corresponds to a different expertise level. An agent may have multiple skills, and hence may be assigned to multiple agent queues 212a-n and 254 simultaneously.

Included among the control programs in the server 110 is a contact vector 216. Work items are assigned by the contact vector 216 to different work item queues 208a-n and 250 based upon a number of predetermined criteria, including contact source identity (e.g., customer identity), customer needs, contact center needs (e.g., goals, objectives, and/or policies), current contact center queue lengths, work item media type, customer value, work item priority level, work item type, and the agent skill that is required for the proper handling of the work item.

The intra-enterprise notification agent 224 provides intra-enterprise contacts to the contact vector 216 for distribution to one or more skill queues 208 and 250 for receipt by one or more agents in skill queues 212 and 254. To invoke the agent, agents and contact center management address an intra-enterprise contact request to the agent 224 and provide selected information in the contact.

In a preferred configuration, a Graphical User Interface or GUI or Telephone User Interface or TUI on the user's communication device is used to generate a contact request. Upon entering a set of DTMF digits (for a circuit-switched phone or IP hardphone) or selecting a menu item (for an IP softphone, Personal Computer or PC, or laptop), the interface of the agent responds with a series of questions.

The responses to the questions are used by the agent 224 to populate various fields in the intra-enterprise contact request. The fields include agent recipient(s), voice, video or text message (including attachments), priority level, target service time (e.g., maximum desired or permissible Estimated Wait Time (EWT), Predicted Wait Time (PWT), and actual or oldest wait time), and likely or maximum time required for the recipient to "service" or process the contact. Attributes for a notification item include, for example, ".Wav" files associated with an announcement extension (e.g., for a recorded audio announcement to an agent), ".Wav" files associated with an IVR script text file or other type of text file, an electronic address (e.g., Universal Resource Locator or URL), an email, a video reference file or clip, an instant message, text-by-phone, and the like.

The agent 224 receives the intra-enterprise notification request and generates one or more notification contacts corresponding to the request. In one configuration, when the contact request indicates multiple agent recipients a single work item is generated by the agent 224 having multiple recipients. Thus, a selected work item would be associated with one or more agent identifiers. In another configuration, when the contact request indicates multiple recipients multiple work items are generated, with each work item having a single recipient. Thus, a selected work item would be associated with only one agent identifier.

Figure 6:
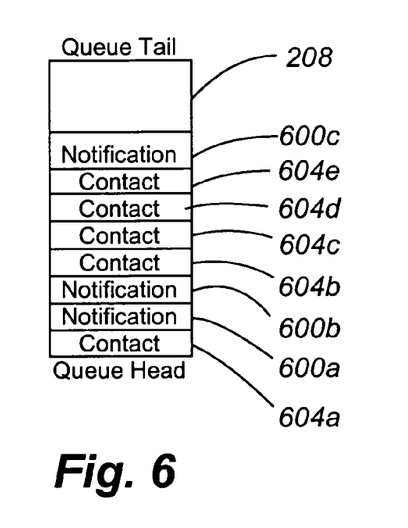
FIG. 6 is a block diagram of a queue according to an embodiment of the present invention.

The generated work item(s) may be enqueued in multiple ways. In one configuration shown in FIG. 6, a customer queue 208a-n contains both types of work items simultaneously. The queue 208a-n contains notifications 600a-c and contacts 604a-e in various assigned queue positions or slots. After the contact 604a at the head of the queue is serviced, the notifications 600a,b become eligible for assignment to one or agents. When one of the notifications 600a,b is to be assigned to multiple agents, the notification is commonly provided to each of the agents at differing times. In other words, the intra-enterprise contacts, after they reach the head of the queue, are held for delivery until the agent recipient becomes available. The same is true when each of the notifications 600a,b is addressed to only one agent but is a subdivision of or otherwise generated from a common intra-enterprise contact. In another configuration, a special queue, namely the intra-enterprise contact queue 250, receives only intra-enterprise contacts and not customer contacts while the contact queues 208a-n receive only customer contacts and not intra-enterprise contacts. In this configuration, the two types of contacts are not enqueued simultaneously in a common queue.

The agents receiving the intra-enterprise contacts can also be configured in multiple ways. In one configuration, a special skill is not set up for servicing the intra-enterprise contact. The contacts are considered to be a part of one or more of the existing skills, namely skills 1 . . . N. In another configuration, a special skill, in addition to skills 1 . . . N, is created. The skill, shown as skill X in FIG. 2, has a corresponding agent queue 254. All agents are considered to have skill X and are thus assigned to the queue 254.

The "blending" of both types of work items in agent assignments is typically handled by appropriately setting the priority levels and/or target wait times associated with both types of work items. If an intra-enterprise contact is to be provided to an agent before the agent services another contact, the agent 224 would assign a priority level to the contact that is higher than the priority levels associated with the enqueued customer contacts in the queue(s). Likewise, if the contact center is in a state of emergency due to one or more goals, objectives, or policies being unmet or violated the agent 224 would assign a priority level that is lower than the priority level(s) of the customer contacts impacted by the emergency.

The customer contact audit engine 228 is a source of intra-enterprise contacts or notifications. The engine 228 monitors data collected by the contact center regarding agent servicing of customer contacts. Typically, the engine examines contact record details. The engine 228 compares the data against a plurality of "norms" or templates, each of which defines acceptable or unacceptable agent behavior. Sample templates defining exceptions or improper agent behavior include agent hung up first, agent was on the phone with a customer more than X minutes or less than Z minutes, agent placed customer on hold for more than Y minutes, agent used inappropriate language during conversation with customer, agent failed to provide selected information to customer, agent failed to properly complete report regarding disposition of contact, agent was in a selected agent state for too long a period of time, etc. When an exception is identified, the engine generates an intra-enterprise contact request directed, typically, to the agent making the error and provides the request to the agent 224 for processing.

The operations of the agent and contact selector 220 and customer contact audit engine 228 will now be described with reference to FIGS. 3-5.

Figure 3:
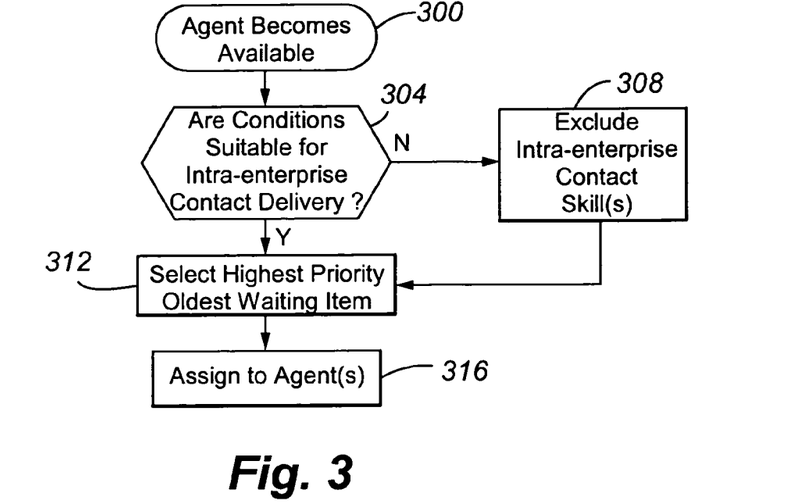
FIG. 3 is a flowchart depicting an operational embodiment of an agent and contact selector.

FIG. 3 illustrates a first operational embodiment of the selector 220.

An agent becomes available in step 300.

In response, the agent 224, in decision diamond 304, determines whether conditions are suitable for intra-enterprise contact delivery. This determination is made by applying a number of filters. The filters generally determine that intra-enterprise contacts are not to be delivered due to the contact center state, which is defined by one or more selected metrics. Exemplary filters would prevent delivery of intra-enterprise contacts when the number of agents in the contact center servicing all or a subset of the contact queues 208 and 250 is less than a selected number (or minimum staffing level), when the number of intra-enterprise contact(s) recipients (in a skill or set of skills) is more than a selected (maximum) number, when the contact is directed to an agent having a skill and the number of agents currently on duty having that skill is less than a selected minimum number (or minimum staffing level), when contact is directed to an agent having a skill and the skill or queue associated with that skill is nearing or already below a selected service level target (or minimum service level target), and when a contact skill or queue is in jeopardy (due to noncompliance with target service time(s) (e.g., EWT, PWT, or actual (oldest) wait time)).

When conditions are not suitable for intra-enterprise contact delivery, the selector 220, in step 308, excludes intra-enterprise contact skill(s) from being eligible for servicing.

When conditions are suitable for intra-enterprise contact delivery or after step 308, the agent, in step 312, selects a highest priority, oldest waiting work item in step 312.

In step 316, the selected work item is provided to the available agent.

Figure 4:
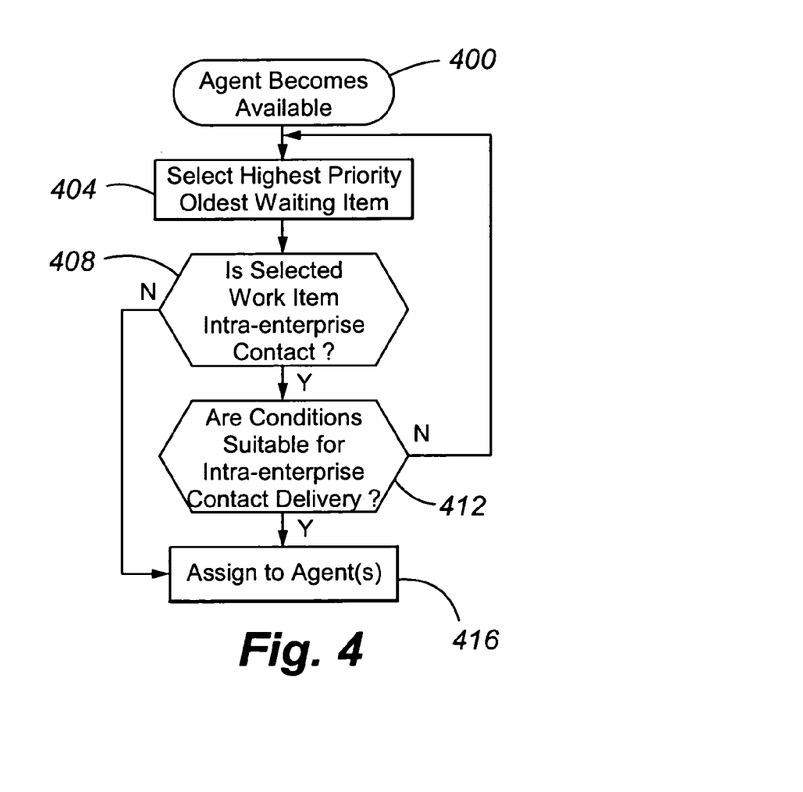
FIG. 4 is a flowchart depicting an operational embodiment of the agent and contact selector.

FIG. 4 illustrates a second operational embodiment of the selector 220.

In step 400, an agent becomes available for servicing of a work item.

In step 404, a highest priority, oldest waiting work item is selected by the selector 220.

In decision diamond 408, the selector determines whether the selected work item is an intra-enterprise contact. If so, the selector, in decision diamond 412, determines whether contact center conditions are suitable for intra-enterprise contact delivery. If the selected work item is not an intra-enterprise contact or if the conditions are suitable for intra-enterprise contact delivery, the selector, in step 416, assigns the selected work item to the available agent. If the selected work item is an intra-enterprise contact and if the conditions are not suitable for intra-enterprise contact delivery, the selector returns to step 404 and selects a the highest priority, oldest waiting customer contact.

In another embodiment, the selector, when an intra-enterprise contact is the highest priority, oldest waiting work item, selects the intra-enterprise contact and the highest priority, oldest waiting customer contact. When the contact center conditions are suitable for delivery of intra-enterprise contacts, the selected intra-enterprise contact is assigned to the available agent. When the contact center conditions are not suitable for delivery of intra-enterprise contacts, the selected customer contact is assigned to the available agent.

Figure 5:
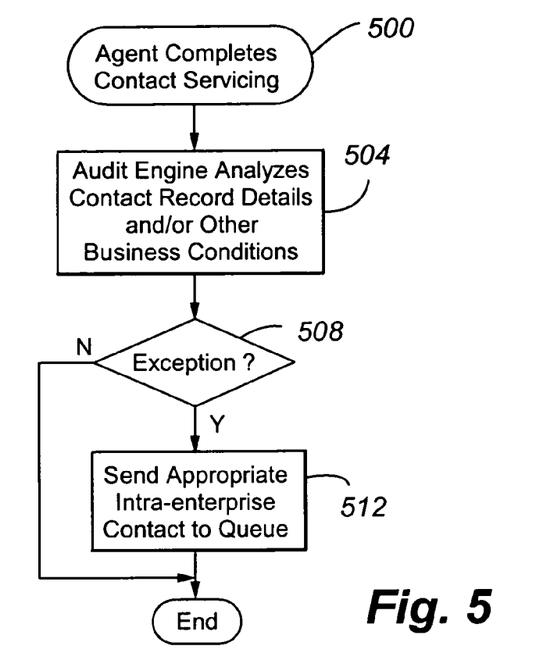
FIG. 5 is a flowchart depicting an operational embodiment of a customer contact audit engine.

FIG. 5 illustrates an operational embodiment of the audit engine.

In step 500, the agent completes servicing of a customer contact.

In step 504, the audit engine analyzes contact record details for the serviced contact and/or other non-agent-specific business conditions (e.g., inventory levels, goal, objective and/or policy compliance for sets of agents, etc.). Contact record details, for example, include agent-generated reports regarding the disposition of the customer contact, a text or recorded transcript of the conversation between the agent and customer, and other details collected by the BCMS or CMS system.

In decision diamond 508, the engine determines whether there are one or more exceptions. If so, the engine, in step 512, sends an appropriate intra-enterprise contact to the appropriate queue. The priority of the contact depends on the priority assigned to the exception.

A number of variations and modifications of the invention can be used. It would be possible to provide for some features of the invention without providing others.

For example in other alternative embodiments, the agent 224, engine 228, and selector 220 are embodied in hardware (such as a logic circuit or Application Specific Integrated Circuit or ASIC), software, or a combination thereof.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for operating a contact center, comprising:
    (a) enqueuing, in a work item queue, an intra-enterprise contact associated with at least first and second internal endpoints of an enterprise network, wherein the intra-enterprise contact is automatically generated when a monitoring agent determines upon collecting and analyzing events compared against a norm that a process violation or improvement is required, wherein the work item queue comprises both customer contacts and intra-enterprise contacts and wherein at least one of the intra-enterprise contacts is between at least two of the customer contacts in the work item queue;
    (b) automatically selecting a work item for assignment to an agent, wherein, in selecting the work item, the intra-enterprise contact and a customer contact are both considered as work items; and
    (c) assigning the selected work item to the agent.

2. The method of claim 1, wherein the intra-enterprise contact is addressed to multiple agents and wherein the intra-enterprise contact is delivered to each of the multiple agents at different times.

3. The method of claim 1, wherein, the assigning step comprises:
    (c1) determining whether a current contact center state is suitable for assigning to the agent the intra-enterprise contact;
    (c2) when the current contact center state is not suitable for assigning the intra-enterprise contact to the agent, assigning the customer contact to the agent; and
    (c3) when the current contact center state is suitable for assigning the intra-enterprise contact to the agent, assigning the intra-enterprise contact to the agent.

4. The method of claim 3, wherein the current contact center state is not suitable for assigning the intra-enterprise contact to the agent when at least one of the following is true:
    (i) a number of agents on duty in the contact center servicing the work item queue is less than a selected number,
    (ii) a number of intra-enterprise contact recipients is more than a selected number,
    (iii) a recipient of the intra-enterprise contact has a skill and a number of agents currently on duty having that skill is less than a selected minimum number,
    (iv) the recipient of the intra-enterprise contact has a skill, the work item queue is associated with that skill, and the work item queue is failing to meet a selected service level target, and
    (v) the recipient of the intra-enterprise contact has a skill, the work item queue is associated with that skill, and the work item queue is in jeopardy due to noncompliance with a target service time.

5. The method of claim 1, wherein the intra-enterprise contact is for one or more of agent training, agent guidance, product inventory state notification, contact center state notification, and product-related notification.

6. The method of claim 1, wherein each of the intra-enterprise contact and customer contact are associated with one or more of a work item priority level and target service time.

7. The method of claim 1, wherein each of a plurality of agents has multiple skills and wherein at least one of the skills includes servicing intra-enterprise contacts.

8. The method of claim 1, further comprising:
    (d) comparing selected customer contact information against a plurality of agent performance templates, each template defining one or more of acceptable and unacceptable agent performance; and
    (e) when a template matches the selected contact information, generating the intra-enterprise contact respecting the event defined by the template, the intra-enterprise contact being addressed to an agent identified in the selected customer contact information.

9. The method of claim 1, wherein the intra-enterprise contact comprises at least one of recorded voice, video, and text, wherein the intra-enterprise contact is not real time, and wherein the intra-enterprise contact is between two or more agents or a supervisor and one or more agents.

10. A non-transitory computer readable medium comprising processor executable instructions to perform the steps of claim 1.

11. A method for operating a contact center, comprising:
    (a) providing an intra-enterprise contact between internal endpoints of an enterprise network via a work item queue, wherein the intra-enterprise contact is automatically generated when a monitoring agent determines upon collecting and analyzing events compared against a norm that a process violation or improvement is required, and wherein at least one of the following is true:
        (i) the intra-enterprise contact is addressed to multiple agents; and
        (ii) the intra-enterprise contact comprises multiple related contacts, each contact being addressed to a different one of the multiple agents; and
    (b) wherein, when each of the multiple agents is available, the intra-enterprise contact is delivered to each of the multiple agents at a different time, wherein the work item queue comprises both customer contacts and intra-enterprise contacts, and wherein at least one of the the intra-enterprise contacts is between at least two of the customer contacts in the work item queue.

12. The method of claim 11, wherein (i) is true.

13. The method of claim 11, wherein (ii) is true.

14. The method of claim 11, further comprising:
    (c) enqueuing, in the work item queue, the intra-enterprise contact;
    (d) selecting a work item for assignment to each of the multiple agents, wherein, in selecting the work item for each of the agents, a customer contact and the intra-enterprise contact are considered.

15. A non-transitory computer readable medium comprising processor executable instructions to perform the steps of claim 11.

16. A contact center, comprising:
    (a) a work item queue comprising an intra-enterprise contact associated with at least first and second internal endpoints of an enterprise, wherein the intra-enterprise contact is automatically generated when a monitoring agent determines upon collecting and analyzing events compared against a norm that a process violation or improvement is required, wherein the work item queue comprises both customer contacts and intra-enterprise contacts, and wherein at least one of the one of the intra-enterprise contacts is between at least two of the customer contacts in the work item queue; and (b) a selector operable to automatically select a work item for assignment to an agent, wherein, in selecting the work item, the selector considers the intra-enterprise contact and a customer contact and automatically assigns the selected work item to the agent, wherein in selecting the work item, the intra-enterprise contact and a customer contact are both considered as work items by the selector.

17. The contact center of claim 16, wherein the intra-enterprise contact is addressed to multiple agents and wherein the intra-enterprise contact is delivered to each of the multiple agents at different times.

18. The contact center of claim 16, wherein the selector is further operable to determine whether a current contact center state is suitable for assigning to the agent the intra-enterprise contact, when the current contact center state is not suitable for assigning the intra-enterprise contact to the agent, assigning the customer contact to the agent, and when the current contact center state is suitable for assigning the intra-enterprise contact to the agent, assigning the intra-enterprise contact to the agent.

19. The contact center of claim 18, wherein the current contact center state is not suitable for assigning the intra-enterprise contact to the agent when at least one of the following is true:

(i) a number of agents on duty in the contact center servicing the work item queue is less than a selected number, (ii) a number of intra-enterprise contact recipients is more than a selected number, (iii) a recipient of the intra-enterprise contact has a skill and a number of agents currently on duty having that skill is less than a selected minimum number, (iv) the recipient of the intra-enterprise contact has a skill, the work item queue is associated with that skill, and the work item queue is failing to meet a selected service level target, and (v) the recipient of the intra-enterprise contact has a skill, the work item queue is associated with that skill, and the work item queue is in jeopardy due to noncompliance with a target service time.

20. The contact center of claim 16, wherein the intra-enterprise contact is for one or more of agent training, agent guidance, product inventory state notification, contact center state notification, and product-related notification.

21. The contact center of claim 16, wherein each of the intra-enterprise contact and customer contact are associated with one or more of a work item priority level and target service time.

22. The contact center of claim 16, wherein each of a plurality of agents has multiple skills and wherein at least one of the skills includes servicing intra-enterprise contacts.

23. The contact center of claim 16, further comprising:

(c) an audit engine operable to compare selected customer contact information against a plurality of agent performance templates, each template defining one or more of acceptable and unacceptable agent performance and, when a template matches the selected contact information, generating the intra-enterprise contact respecting the event defined by the template, the intra-enterprise contact being addressed to an agent identified in the selected customer contact information.

24. The contact center of claim 16, wherein the intra-enterprise contact comprises at least one of recorded voice, video, and text, wherein the intra-enterprise contact is not real time, and wherein the intra-enterprise contact is between two or more agents or a supervisor and one or more agents.

* * * * *